United States Patent
Kim et al.

(10) Patent No.: US 9,274,616 B2
(45) Date of Patent: Mar. 1, 2016

(54) POINTING ERROR AVOIDANCE SCHEME

(75) Inventors: Seungil Kim, Seoul (KR); Youngil Ko, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 90 days.

(21) Appl. No.: 13/813,339

(22) PCT Filed: Sep. 11, 2012

(86) PCT No.: PCT/US2012/054614
§ 371 (c)(1),
(2), (4) Date: Jan. 30, 2013

(87) PCT Pub. No.: WO2014/042617
PCT Pub. Date: Mar. 20, 2014

(65) Prior Publication Data
US 2014/0071048 A1   Mar. 13, 2014

(51) Int. Cl.
*G06F 3/033* (2013.01)
*G06F 3/023* (2006.01)
*G06F 3/038* (2013.01)
*G06F 3/0354* (2013.01)

(52) U.S. Cl.
CPC .............. *G06F 3/033* (2013.01); *G06F 3/0236* (2013.01); *G06F 3/038* (2013.01); *G06F 3/03545* (2013.01)

(58) Field of Classification Search
CPC ................................ G06F 3/033; G06F 3/0236
USPC .......... 345/157, 168, 169, 173, 179; 715/851, 715/856, 863; 341/22
See application file for complete search history.

(56) References Cited

U.S. PATENT DOCUMENTS

| | | | |
|---|---|---|---|
| 6,177,926 B1 | 1/2001 | Kunert | |
| 6,295,049 B1 | 9/2001 | Minner | |
| 6,295,052 B1 | 9/2001 | Kato et al. | |
| 7,614,008 B2 | 11/2009 | Ording | |
| 2010/0123659 A1 | 5/2010 | Beeman et al. | |
| 2010/0141577 A1* | 6/2010 | Moritaku | 345/157 |
| 2010/0141606 A1* | 6/2010 | Bae et al. | 345/174 |
| 2010/0321286 A1 | 12/2010 | Haggerty et al. | |
| 2011/0316772 A1* | 12/2011 | Zhang et al. | 345/156 |
| 2012/0194429 A1* | 8/2012 | Kwon et al. | 345/157 |

OTHER PUBLICATIONS

International Search Report from International Application No. PCT/US12/54614 mailed Nov. 19, 2012.

* cited by examiner

*Primary Examiner* — Hong Zhou
(74) *Attorney, Agent, or Firm* — Brundidge & Stanger, P.C.

(57) ABSTRACT

Technologies are generally described for a pointing error avoidance scheme. In some examples, a method performed under control of a computing system with a display, may include detecting an input event applied to the computing system at a pointing location in a first area of the display, determining a first time duration for which the pointing location has been maintained in the first area, determining a second time duration for which the pointing location had been previously maintained in a previous area of the display before the pointing location moved into the first area, and determining an intended pointing location of the input event based at least in part on at least one of the first time duration and the second time duration.

16 Claims, 6 Drawing Sheets ial application
No. PCT/US12/54614, filed on Sep. 11, 2012, the entirety of which is incorporated herein by reference.

BACKGROUND

Many types of input devices are available for performing operations in a computing system, such as a keyboard, a mouse, a pen, a trackball, a joystick, a touch sensor panel, a touchscreen, a motion controller, a voice input device, and the like. Among the various input devices, the motion controller is widely used as a controller for video games or smart TVs. The motion controller uses an accelerometer to detect its approximate orientation and acceleration, and serves an image sensor, so it can be used as a pointing device. A user of the motion controller may move the motion controller to be directed to a desired location on a screen, and/or click a button for selecting an icon or a virtual key displayed at the location.

SUMMARY

In an example, a method performed under control of a computing system with a display may include detecting an input event applied to the computing system at a pointing location in a first area of the display, determining a first time duration for which the pointing location has been maintained in the first area, determining a second time duration for which the pointing location had been previously maintained in a previous area of the display before the pointing location moved into the first area, and determining an intended pointing location of the input event based at least in part on at least one of the first time duration and the second time duration.

In another example, a computing system may include a pointing location tracking unit configured to track, in terms of time, a change of a pointing location to which an input device is directed, the input device interacting with the computing system; an input event detection unit configured to detect an input event applied from the input device to the computing system; and an intended pointing location determination unit configured to determine an intended pointing location of the input event detected by the input event detection unit, based at least in part on the change of the pointing location of the input device tracked by the pointing location tracking unit.

In yet another example, a computer-readable storage medium may store thereon computer-executable instructions that, in response to execution, cause a computing system to perform operations, including: tracking, in terms of time, a change of a pointing location to which an input device is directed, the input device interacting with the computing system; detecting an input event applied from the input device to the computing system; and determining a user-intended pointing location of the input event based at least in part on the tracked change of the pointing location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
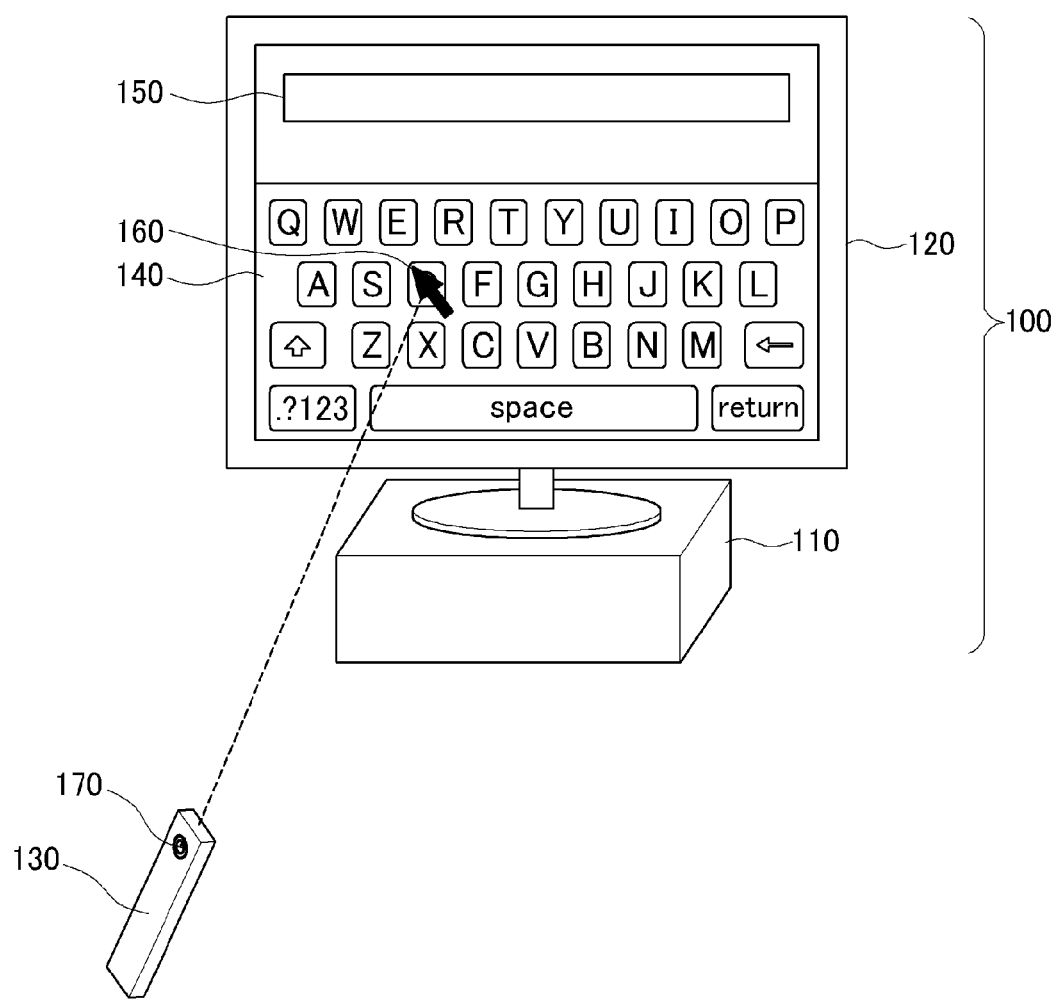
FIG. 1 schematically shows an illustrative example of an environment in which an input device interacts with a computing system for performing operations in the computing system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a pointing error avoidance scheme for a computing system. Further, technologies are herein generally described for a computing system configured to interact with an external pointing input device.

In some examples, the computing system may include a display configured to display a cursor moving corresponding to movement of the pointing input device. For example, when a user moves the pointing input device up, down, left and right, the cursor may move up, down, left and right accordingly.

In some examples, the user may use a button of the pointing input device to select an icon or a virtual key displayed on the display. The user may move the pointing input device so that the cursor on the display may hover a desired icon or virtual key. The user may then click the button to select the icon or virtual key over which the cursor hovers.

In some examples, the computing system may determine a pointing location of the pointing input device on a display when the user clicks the button, and determine an operation intended by the user who selects the icon or virtual key displayed at the pointing location. Then, the computing system may perform the operation associated with the selected icon or virtual key.

In some examples, when the user clicks the button, the cursor, which corresponds to the pointing location, may inadvertently move to a different icon or virtual key due to the user's hand moving. In such cases, the computing system may correct such a pointing error.

In some examples, the computing system may determine whether the cursor's location has changed from on a first key to on a second key simultaneously with or immediately prior to the user clicking the button on the pointing device. When the computing system determines that the change of the pointing location occurred simultaneously with or immediately prior to the user clicking the button on the pointing device, the computing system may determine that the user's intention was to select the first key, instead of the second key, although the user clicked the button when the cursor was hovering over the second key. That is, the computing system may determine an intended pointing location based at least in part on the change of the pointing location, using time as a basis for the determination.

By way of example, but not limitation, it may be assumed that the user intends to select a virtual key 'S' among multiple virtual keys of a virtual keyboard displayed on the display. But, as the user clicks the button on the pointing device, the cursor inadvertently moves onto a virtual key 'D' which is located adjacent to virtual key 'S' on a "QWERTY" keyboard configuration, which is referenced herein as a non-limiting example of keyboard configurations. In such cases, when a time duration for which the pointing location has been maintained in an area of virtual key 'D' is discernibly less than a time duration for which the pointing location had been previously maintained in an area of virtual key 'S,' the computing system may determine that the user intended to select virtual key 'S.'

FIG. 1 schematically shows an illustrative example of an environment in which an input device interacts with a computing system for performing operations in the computing system, arranged in accordance with at least some embodiments described herein.

As depicted in FIG. 1, a computing system 100 may include a console 110, a display 120, and an input device 130. Examples of computing system 100 may include, but are not limited to, a smart TV, a video gaming system, and any other system that may receive an input from a user and provide the user with a requested output. Although illustrated as discrete components, the components of computing system 100 may be divided into additional components, or combined into fewer components, depending on the desired implementation.

In some embodiments, a user (not shown) may use input device 130 to manipulate or control computing system 100. In some embodiments, input device 130 may interact or communicate with computing system 100 using short-range communication technologies including, for example, an infrared light signal, a radio signal, Bluetooth, etc. Examples of input device 130 may include, but are not limited to, a remote controller, a motion controller (e.g., Wii Remote™ of Nintendo Co., Ltd.), and any other pointing input devices capable of interacting with computing system 100.

In some embodiments, display 120 may display a virtual keyboard 140 and a text field 150 so that the user may enter text characters. In some embodiments, display 120 may further display a cursor 160, which may indicate a pointing location of input device 130. In such cases, when the user tries to enter a character, the user may move input device 130 until cursor 160 hovers over one of virtual keys of virtual keyboard 140 corresponding to the character, and the user may then click a button 170 of input device 130 to select the desired virtual key.

In some embodiments, the user clicking button 170 may trigger an input event that may be detected by computing system 100. Computing system 100 may also detect the pointing location to which input device 130 is directed at the time of the occurrence of the input event.

In some embodiments, computing system 100 may determine a first area of display 120, within which the pointing location is located at the time of the occurrence of the input event. Then, in some embodiments, computing system 100 may determine whether the user's intended pointing location of the input event is within the first area or not.

In some embodiments, computing system 100 may measure a first time duration in which the pointing location has been maintained in the first area, and measure a second time duration for which the pointing location had been previously maintained in a previous area of display 120 before the pointing location moved into the first area. Then, computing system 100 may determine the intended pointing location of the input event based at least in part on the first time duration and/or the second time duration. An example process for determining the intended pointing location of the input event based at least in part on the first time duration and/or the second time duration will be described in more detail with reference to FIGS. 2A and 2B, which show examples of diagrams illustrating a change of a pointing location in terms of time, arranged in accordance with at least some embodiments described herein.

Figure 2A:
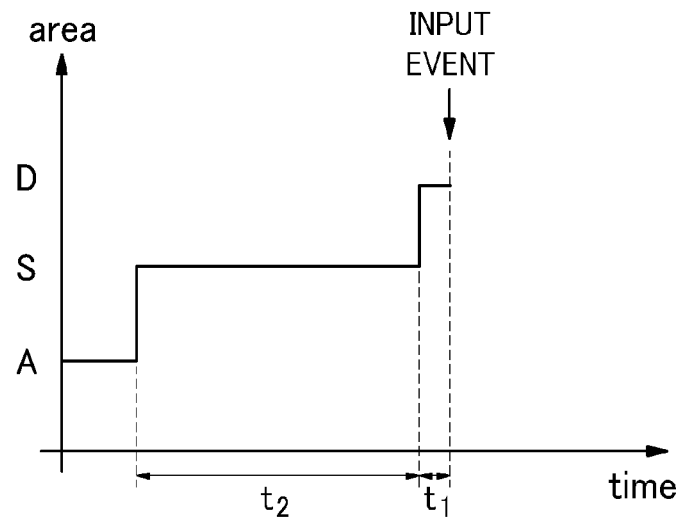
FIGS. 2A and 2B show examples of diagrams illustrating a change of a pointing location in terms of time, arranged in accordance with at least some embodiments described herein.
Figure 2B:
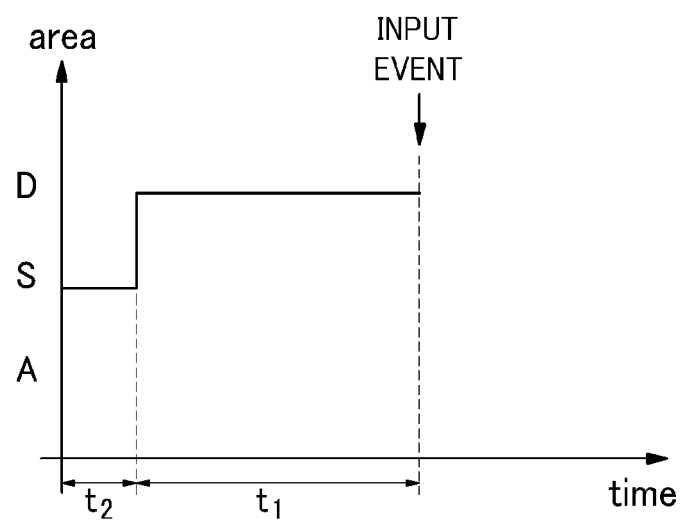

As depicted in FIGS. 2A and 2B, it may be assumed that the pointing location when the user clicks button 170 (i.e., at the time of the occurrence of the input event) is in an area of virtual key 'D'. In such cases, computing system 100 may determine whether the intended pointing location of the input event is within the area of virtual key 'D', or within an area of another virtual key, based at least in part on a change of the pointing location prior to the input event. By way of example, but not limitation, it may be assumed that the pointing location was within an area of a virtual key 'S' before the pointing location moved into the area of virtual key 'D'. In such cases, computing system 100 may determine the first time duration for which the pointing location has been maintained in the area of virtual key 'D' (i.e., $t_1$ in FIGS. 2A and 2B), and the second time duration for which the pointing location has been maintained in the area of virtual key 'S' (i.e., $t_2$ in FIGS. 2A and 2B).

In some embodiments, computing system 100 may determine the intended pointing location of the input event based at least in part on a ratio of the first time duration to the second time duration (i.e., $t_1/t_2$ in FIGS. 2A and 2B). Referring to FIGS. 2A and 2B, computing system 100 may determine the intended pointing location of the input event as being located in the area of virtual key 'S' if the ratio ($t_1/t_2$) is less than a predetermined value as in FIG. 2A, and determine the intended pointing location as being located in the area of virtual key 'D' if the ratio ($t_1/t_2$) is greater than or equal to the predetermined value as in FIG. 2B. By way of example, but not limitation, the predetermined value may be associated with (e.g., set and/or updated at least in part on) empirical data analyzed from behavior of the user, including a usage pattern of the user. Further, if the usage pattern of the user indicates that an input error tends to occur when the ratio ($t_1/t_2$) is less than 0.1, computing system 100 may set the predetermined value as 0.1 for the user. For example, the predetermined value may be set as one (1).

In some alternative embodiments, computing system 100 may determine the intended pointing location of the input event based at least in part on the first time duration (i.e., $t_1$ in FIGS. 2A and 2B). Referring to FIGS. 2A and 2B, computing system 100 may determine the intended pointing location of the input event as being located in the area of virtual key 'S' if the first time duration ($t_1$) is less than a predetermined amount of time as in FIG. 2A, and determine the intended pointing location as being located in the area of virtual key 'D' if the first time duration ($t_1$) is greater than or equal to the predetermined amount of time as in FIG. 2B. By way of example, but not limitation, the predetermined amount of time may be associated with (e.g., set and/or updated at least in part on) empirical data analyzed from behavior of the user, including the user's usage pattern. Further, if the user's usage pattern indicates that an input error tends to occur when the first time duration ($t_1$) is less than 0.1 second, computing system 100 may set the predetermined amount of time as 0.1 second for the user.

In some other alternative embodiments, computing system 100 may determine the intended pointing location of the input event as being located in the area of virtual key 'S' if $t_1 < \alpha t_2 + \beta$ as in FIG. 2A, and determine the intended pointing location as being located in the area of virtual key 'D' if $t_1 \geq \alpha t_2 + \beta$ as in FIG. 2B. For example, values of $\alpha$ and $\beta$ may be associated with (e.g., set and/or updated at least in part on) empirical data analyzed from behavior of the user.

In some alternative embodiments, display 120 may include a touch screen display. In such cases, touching and/or gesturing on the touch screen display may trigger the input event. By way of example, but not limitation, when the user tries to enter a character using virtual keyboard 140 displayed on the touch screen display, the user may touch the desired virtual key with his/her finger, and lift the finger from the display to select the corresponding character. In such cases, since lifting the finger from the display may occur on another virtual key inadvertently due to the user's hand moving, computing system 100 may determine the intended pointing location of the input event based at least in part on a first time duration for which the finger has been maintained in a first area of the virtual key from which the user's finger is lifted and/or a second time duration for which the finger had been previously maintained in a previous area before the finger moved into the first area.

In some other alternative embodiments, computing system 100 may include a motion sensing input device (not shown) such as, for example, Kinect™ of Microsoft Corporation. In such cases, the user's motion may trigger the input event. By way of example, but not limitation, when the user tries to enter a character, the user may point one of the virtual keys of virtual keyboard 140 displayed on display 120 with his/her finger, and make a predetermined selecting gesture or speak a predetermined command for selecting the virtual key. In such case, since capturing of the selecting gesture and/or the spoken command may occur when the user's finger is directed to another virtual key inadvertently due to the user's moving, computing system 100 may determine the intended pointing location of the input event based at least in part on a first time duration for which the finger has been maintained in a first area of the virtual key on which the user's selecting gesture and/or spoken command is captured and/or a second time duration for which the finger had been previously maintained in a previous area before the finger moved into the first area.

Although FIGS. 1-2 illustrate the embodiments associated with virtual keyboard 140 displayed on display 120, those skilled in the art will recognize that the scheme disclosed herein may be applied to any graphical user interface displayed on display 120. Further, although the above embodiments described with reference to FIGS. 1-2 illustrate that computing system 100 performs operations including detecting the input event, determining the first and second time durations, determining the intended pointing location, and so on, those skilled in the art will recognize that it may be an application run on computing system 100, program modules of computing system 100, and/or a cloud-based application accessed by computing system 100 that performs any operations described herein.

Figure 3:
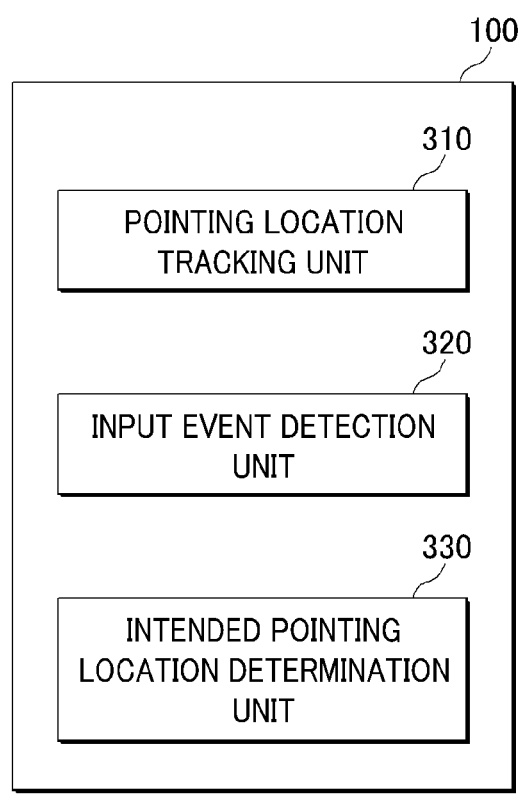
FIG. 3 shows a schematic block diagram illustrating an example architecture of a computing system for providing a pointing error avoidance scheme, arranged in accordance with at least some embodiments described herein.

FIG. 3 shows a schematic block diagram illustrating an example architecture of a computing system for providing a pointing error avoidance scheme, arranged in accordance with at least some embodiments described herein.

As depicted, computing system 100 may include a pointing location tracking unit 310, an input event detection unit 320, and an intended pointing location determination unit 330. Although illustrated as discrete components, various components may be divided into additional components, combined into fewer components, or eliminated while being contemplated within the scope of the disclosed subject matter.

Pointing location tracking unit 310 may be configured to track, in terms of time, a change of a pointing location to which an input device (e.g., input device 130) is directed. In some embodiments, the pointing location may be a location on a display (e.g., display 120) of computing system 100 to which the input device is directed. Examples of the input device may include, but are not limited to, a remote controller, a motion controller, and any other pointing input devices capable of interacting with computing system 100.

Input event detection unit 320 may be configured to detect an input event applied from the input device to computing system 100. In some embodiments, the input event may be triggered by a user's action of clicking of a button (e.g., button 170) of the input device.

Intended pointing location determination unit 330 may be configured to determine an intended pointing location of the input event detected by input event detection unit 320, based at least in part on the change of the pointing location of the input device tracked by pointing location tracking unit 310. In some embodiments, intended pointing location determination unit 330 may determine the intended pointing location of the input event based at least in part on a first time duration for which the pointing location has been maintained in a first area in which input event detection unit 320 detects the input event and/or a second time duration for which the pointing location had been maintained in a previous area before the pointing location moved into the first area.

In some embodiments, intended pointing location determination unit 330 may determine the intended pointing location of the input event as being located in the first area if a ratio of the first time duration to the second time duration is greater than or equal to a predetermined value, and determine the intended pointing location of the input event as being located in the previous area if the ratio of the first time duration to the second time duration is less than the predetermined value. By way of example, but not limitation, the predetermined value may be associated with empirical data analyzed from behavior of the user. By way of another example, but not limitation, the predetermined value may be one (1).

In some alternative embodiments, intended pointing location determination unit 330 may determine the intended pointing location of the input event being located in the first area if the first time duration is greater than or equal to a predetermined amount of time, and determine the intended pointing location of the input event as being located in the previous area if the first time duration is less than the predetermined amount of time. By way of example, but not limitation, the predetermined amount of time may be associated with empirical data analyzed from behavior of the user.

As such, computing system 100 may avoid a potential pointing error due to the user's hand moving by inferring the users intended input based at least in part on the tracked change of the pointing location.

Figure 4:
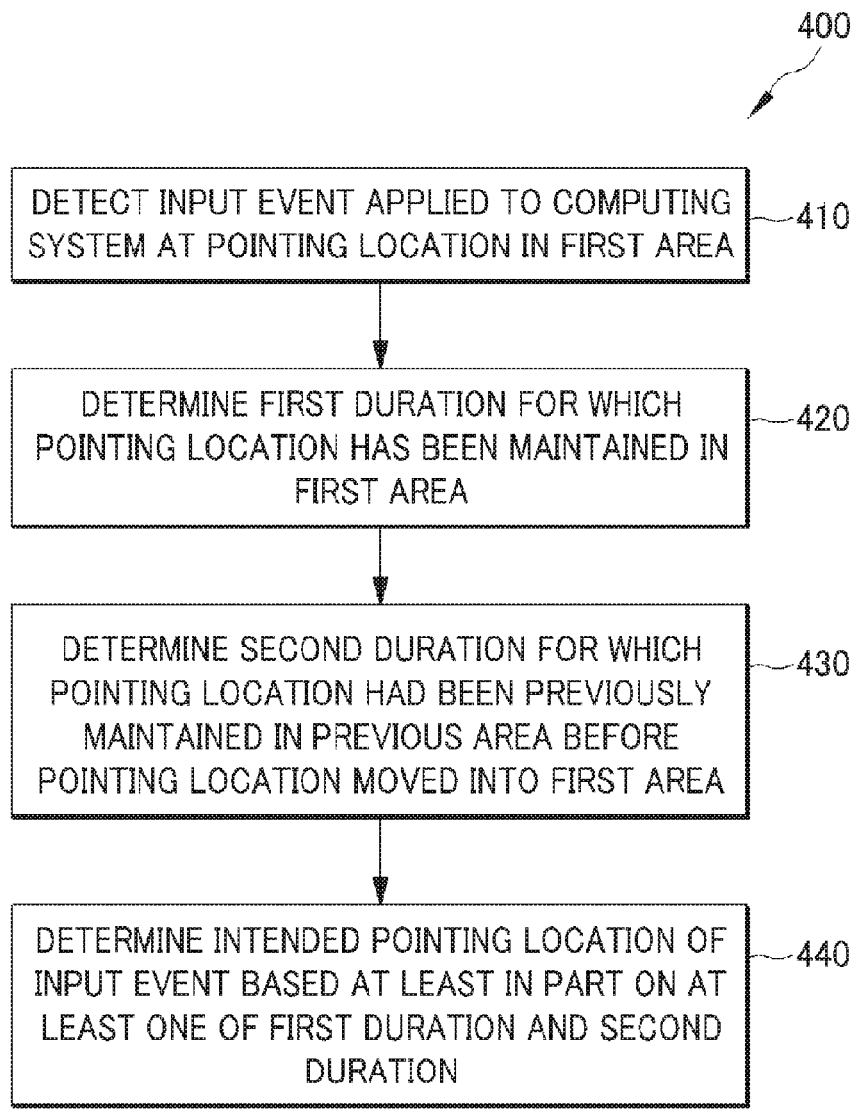
FIG. 4 shows an example flow diagram of a process for providing a pointing error avoidance scheme, arranged in accordance with at least some embodiments described herein.

FIG. 4 shows an example flow diagram of a process for providing a pointing error avoidance scheme, arranged in accordance with at least some embodiments described herein.

The process in FIG. 4 may be implemented in a computing system, such as computing system 100 including pointing location tracking unit 310, input event detection unit 320 and intended pointing location determination unit 330, described above. An example process 400 may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410 (Detect Input Event Applied to Computing System at Pointing Location in First Area), the computing system may detect an input event applied to the computing system at a pointing location in a first area of a display (e.g., display 120) of the computing system. In some embodiments, the first area may be associated with a virtual key of a virtual keyboard or an icon displayed on the display.

In some embodiments, the computing system may be configured to receive an input signal from an external pointing input device (e.g., input device 130). In such cases, the pointing location may be a location on the display to which the external pointing input device is directed, and the input event may be triggered by clicking of a button (e.g., button 170) of the external pointing input device. In some alternative embodiments, when the display includes a touch screen display, the input event may be triggered by the users touching and/or gesturing on the touch screen display. In some other alternative embodiments, when the computing system configures to receive the users input via a motion sensing input device (e.g., Kinect™ of Microsoft Corporation), the input event may be triggered by the user's gesturing. Processing may continue from block 410 to block 420.

At block 420 (Determine First Duration for which Pointing Location has been Maintained in First Area), the computing system may determine a first time duration for which the pointing location has been maintained in the first area. Processing may continue from block 420 to block 430.

At block 430 (Determine Second Duration for which Pointing Location had been Previously Maintained in Previous Area before Pointing Location Moved into First Area), the computing system may determine a second time duration for which the pointing location had been previously maintained in a previous area of the display before the pointing location moved into the first area. Processing may continue from block 430 to block 440.

At block 440 (Determine Intended Pointing Location of Input Event based at least in part on at least one of First Duration and Second Duration), the computing system may determine an intended pointing location of the input event based at least in part on at least one of the first time duration and the second time duration.

In some embodiments, the computing system may determine the intended pointing location of the input event as being located in the first area if a ratio of the first time duration to the second time duration is greater than or equal to a predetermined value, and determine the intended pointing location as being located in the previous area if the ratio of the first time duration to the second time duration is less than the predetermined value. By way of example, but not limitation, the predetermined value may be associated with empirical data analyzed from behavior of the user. By way of another example, but not limitation, the predetermined value may be one (1).

In some alternative embodiments, the computing system may determine the intended pointing location as being located in the first area if the first time duration is greater than or equal to a predetermined amount of time, and determine the intended pointing location as being located in the previous area if the first time duration is less than the predetermined amount of time. By way of example, but not limitation, the predetermined amount of time may be associated with empirical data analyzed from behavior of the user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
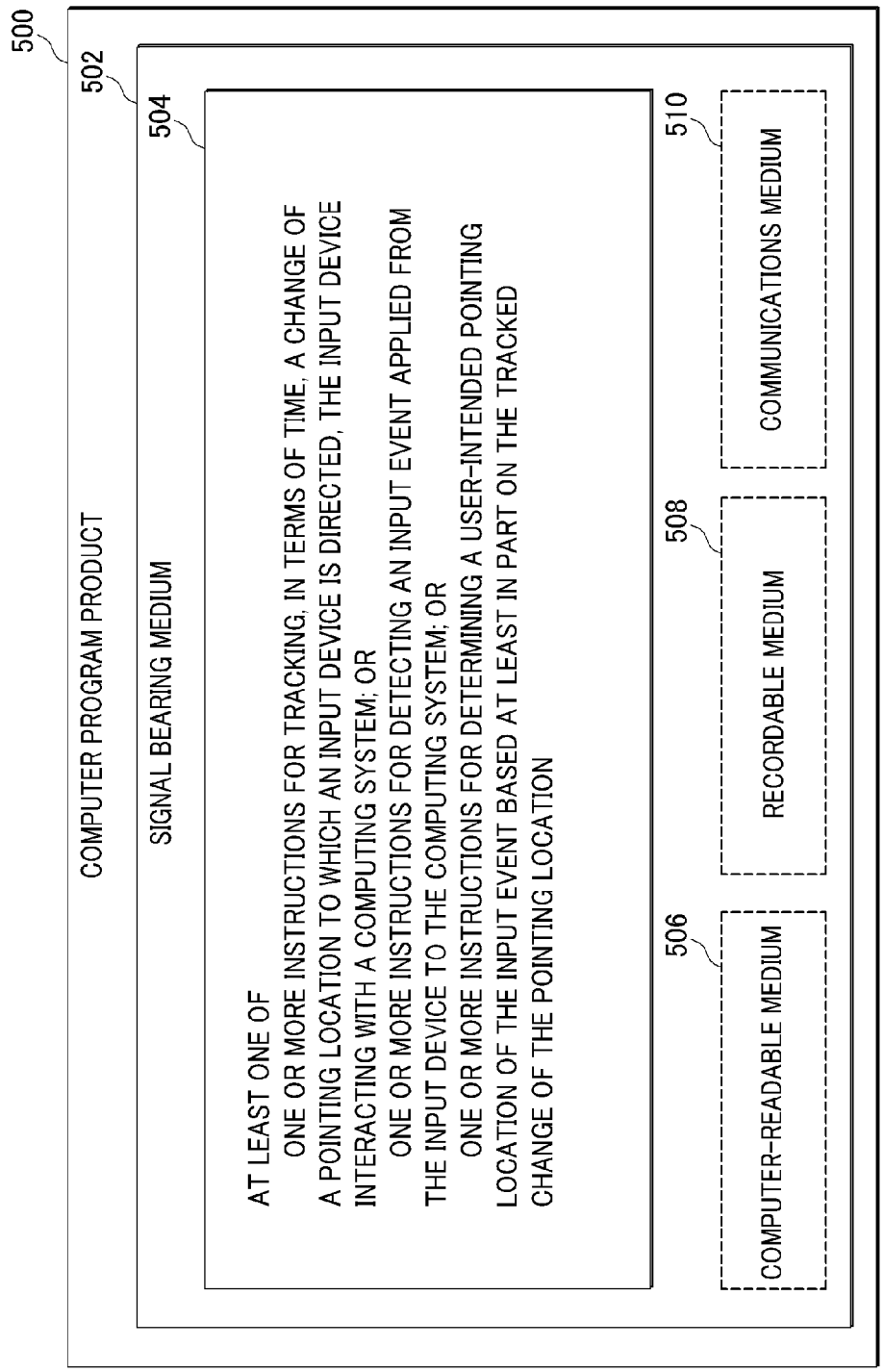
FIG. 5 illustrates example computer program products that may be utilized to provide a pointing error avoidance scheme, arranged in accordance with at least some embodiments described herein.

FIG. 5 illustrates example computer program products that may be utilized to provide a pointing error avoidance scheme, arranged in accordance with at least some embodiments described herein.

Computer program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for tracking, in terms of time, a change of a pointing location to which an input device is directed, the input device interacting with a computing system; one or more instructions for detecting an input event applied from the input device to the computing system; or one or more instructions for determining a user-intended pointing location of the input event based at least in part on the tracked change of the pointing location. Thus, for example, referring to FIG. 3, computing system 100 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of computing system 100 by an RF signal bearing medium 502, where the signal bearing medium 502 is conveyed by a wireless communications medium 510 (e.g., a wireless communications medium conforming with the IEEE 802.11 standard).

Figure 6:
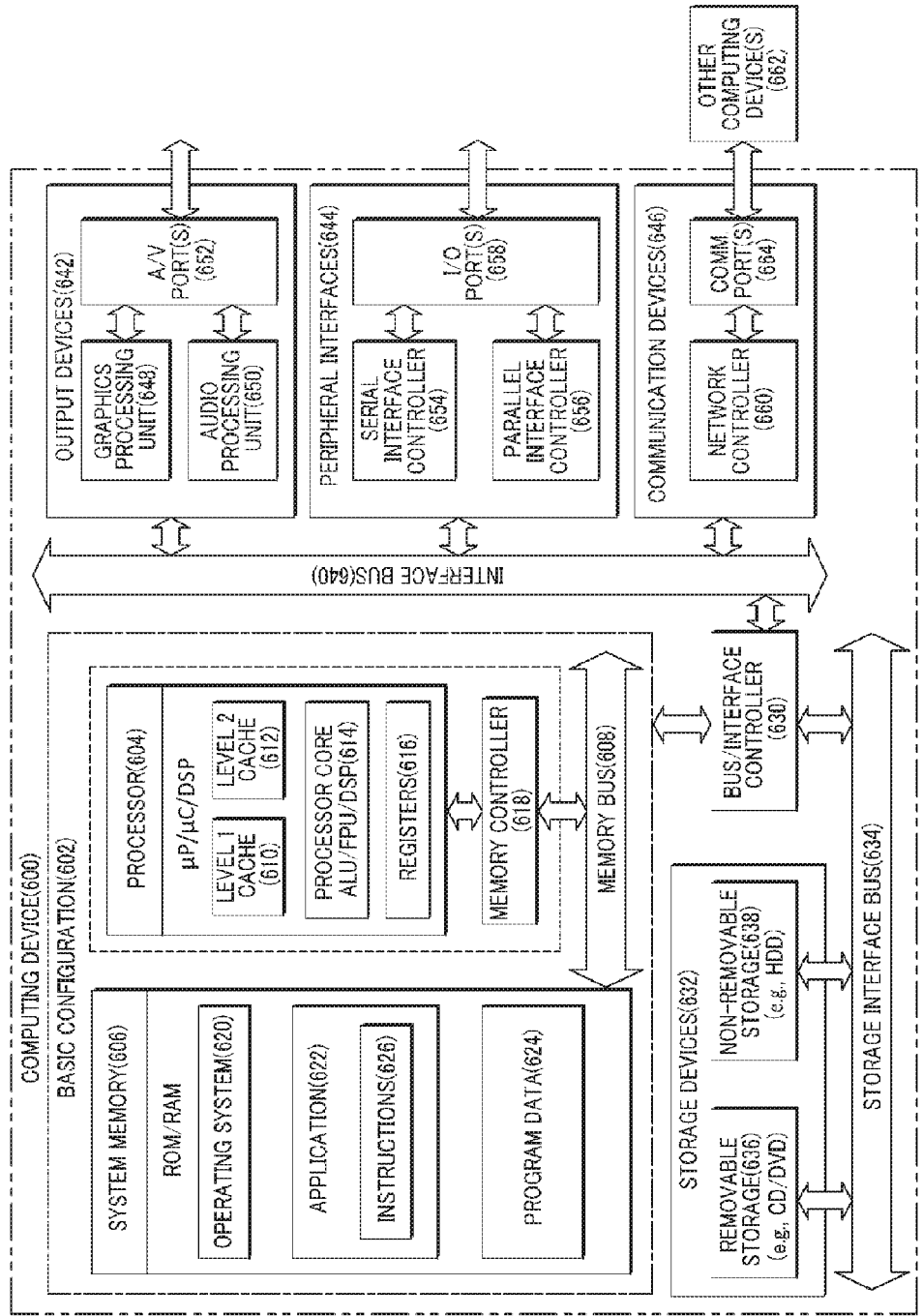
FIG. 6 is a block diagram illustrating an example computing device that may be utilized to provide a pointing error avoidance scheme, arranged in accordance with at least some embodiments described herein.
Figure 6:
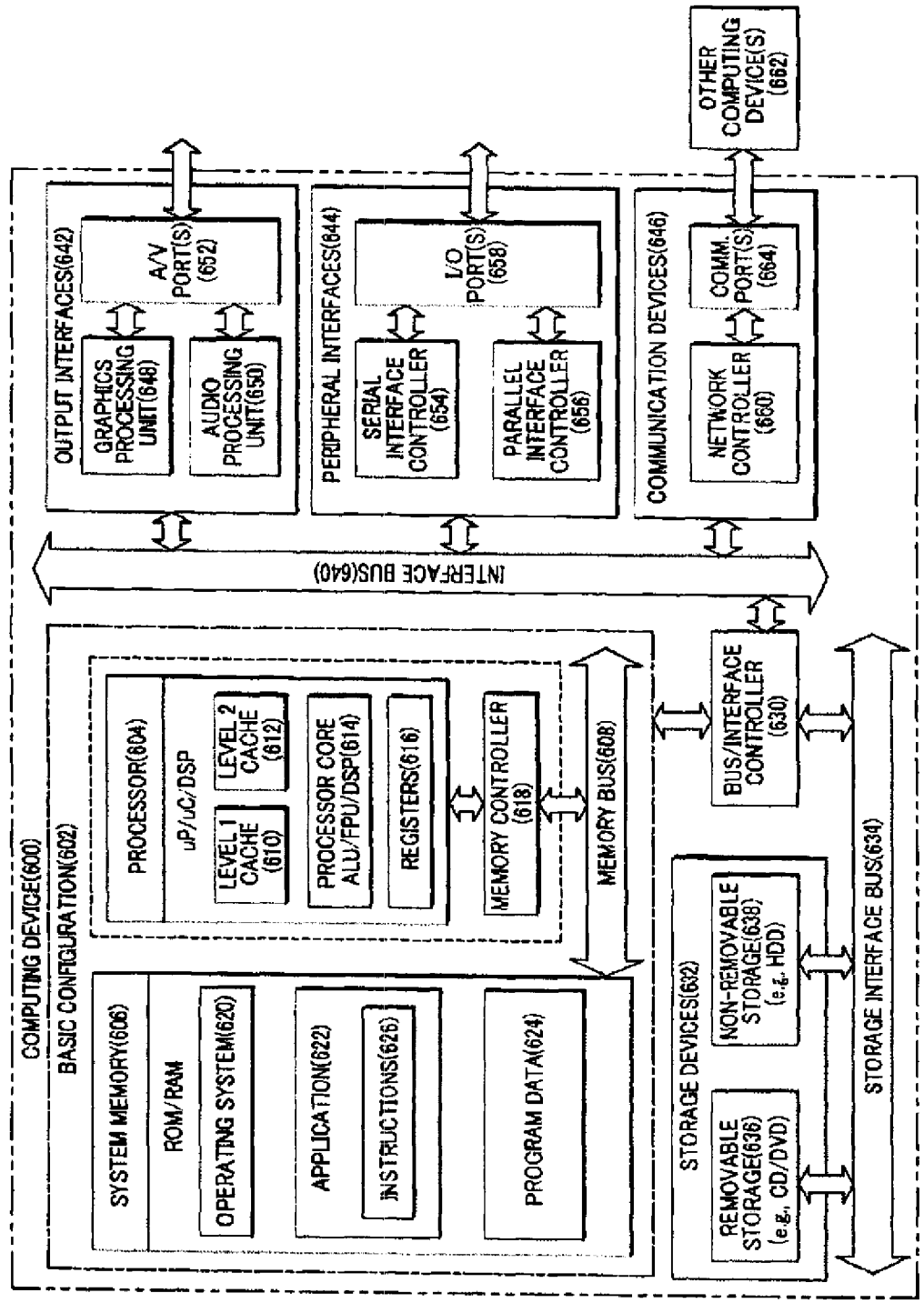

FIG. 6 is a block diagram illustrating an example computing device that may be utilized to provide a pointing error avoidance scheme, arranged in accordance with at least some embodiments described herein.

In these examples, elements of computing device 600 may be arranged or configured for computing system 100. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller C), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), nonvolatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the computing system 100 architecture as shown in FIG. 3 or including the actions described with respect to the flow charts shown in FIG. 4. In some examples, application 622 may be arranged to operate with program data 624 on an operating system 620 such that implementations for instructions for a computing system as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a computing system with a display, comprising:
    detecting an input event applied to the computing system at a pointing location in a first area of the display;
    determining a first time duration for which the pointing location has been maintained in the first area;
    determining a second time duration for which the pointing location had been previously maintained in a previous area of the display before the pointing location moved into the first area; and
    determining an intended pointing location of the input event based at least in part on the first time duration being less than the second time duration proportionally weighted by empirical data analyzed from behavior of a user of the computing system.

2. The method of claim 1,
    wherein the computing system is configured to receive an input signal from an external pointing input device,
    wherein the input event is triggered by clicking of a button of the external pointing input device, and
    wherein the pointing location is a location on the display to which the external pointing input device is directed.

3. The method of claim 1,
    wherein the display includes a touch screen display,
    wherein the input event is triggered by at least one of touching and gesturing on the touch screen display, and
    wherein the pointing location is a location on the touch screen display at which an object contacts.

4. The method of claim 1, wherein the second time duration is further offset by additional empirical data analyzed from behavior of a user of the computing system.

5. The method of claim 1, wherein each of the first area and the previous area is associated with a key of a virtual keyboard displayed on the display.

6. The method of claim 1,
    wherein the computing system comprises a motion sensing input device,
    wherein the input event is triggered by at least one of pointing a finger, making a predetermined gesture and speaking a predetermined command, and
    wherein the pointing location is at least one of a location pointed to by the finger, predetermined location indicated by a predetermined gesture and a predetermined location indicated by a predetermined spoken command.

7. A computing system, comprising:
    a pointing location tracking unit configured to:

track, in terms of time, a change of a pointing location to which an input device is directed,
determine a first time duration for which the pointing location has been maintained in a first area, and
determine a second time duration for which the pointing location had been previously maintained in a previous area before the pointing location moved into the first area,
wherein the input device is configured to interact with the computing system;
an input event detection unit configured to detect an input event applied from the input device to the computing system; and
an intended pointing location determination unit configured to:
determine an intended pointing location of the input event detected by the input event detection unit, based at least in part on the first time duration being less than the second time duration proportionally weighted by empirical data analyzed from behavior of a user of the computing system.

8. The computing system of claim 7,
wherein the input device includes an external pointing input device,
wherein the input event is triggered by clicking of a button of the external pointing input device, and
wherein the pointing location is a location on a display of the computing system to which the external pointing input device is directed.

9. The computing system of claim 7, wherein the second time duration is further offset by additional empirical data analyzed from behavior of a user of the computing system.

10. The computing system of claim 7,
wherein the computing system further comprises a motion sensing input device,
wherein the input event is triggered by at least one of pointing a finger, making a predetermined gesture and speaking a predetermined command, and
wherein the pointing location is at least one of a location pointed to by the finger, predetermined location indicated by a predetermined gesture and a predetermined location indicated by a predetermined spoken command.

11. A non-transitory computer-readable medium having stored thereon computer-executable instructions that, in response to execution, cause a computing system to perform operations, comprising:
tracking, in terms of time, a change of a pointing location to which an input device is directed, the input device interacting with the computing system;
detecting an input event applied from the input device to the computing system; determining a first time duration for which the pointing location has been maintained in a first area;
determining a second time duration for which the pointing location had been previously maintained in a previous area before the pointing location moved into the first area;
determining a ratio of the first time duration to a second time duration; and
determining a user-intended pointing location of the input event based at least in part on the first time duration being less than the second time duration proportionally weighted by empirical data analyzed from behavior of a user of the computing system.

12. The non-transitory computer-readable medium of claim 11, wherein the operations further comprise:
determining whether the input event is made at a user-intended pointing location based at least in part on the tracked change of the pointing location.

13. The non-transitory computer-readable medium of claim 11, wherein the second time duration is further offset by additional empirical data analyzed from behavior of a user of the computing system.

14. The non-transitory computer-readable medium of claim 11,
wherein the computing system comprises a display,
wherein the computing device is configured to receive an input signal from an external pointing input device,
wherein the input event is triggered by clicking of a button of the external pointing input device, and
wherein the pointing location is a location on the display to which the external pointing input device is directed.

15. The non-transitory computer-readable medium of claim 11,
wherein the computing system comprises a touch screen display,
wherein the input event is triggered by at least one of touching and gesturing on the touch screen display, and
wherein the pointing location is a location on the touch screen display at which an object contacts.

16. The non-transitory computer-readable medium of claim 11,
wherein the computing system comprises a motion sensing input device,
wherein the input event is triggered by at least one of pointing a finger, making a predetermined gesture and speaking a predetermined command, and
wherein the pointing location is at least one of a location pointed to by the finger, predetermined location indicated by a predetermined gesture and a predetermined location indicated by a predetermined spoken command.

* * * * *

UNITED STATES PATENT AND TRADEMARK OFFICE
CERTIFICATE OF CORRECTION

| | | |
|---|---|---|
| PATENT NO. | : 9,274,616 B2 | |
| APPLICATION NO. | : 13/813339 | |
| DATED | : March 1, 2016 | |
| INVENTOR(S) | : Kim et al. | |

It is certified that error appears in the above-identified patent and that said Letters Patent is hereby corrected as shown below:

Drawings

Delete Drawing sheet 6 of 6 and replace with Drawing sheet 6. (attached)

Specification

In Column 7, Line 10, delete "users" and insert -- user's --, therefor.

In Column 7, Line 42, delete "users" and insert -- user's --, therefor.

In Column 7, Line 45, delete "users" and insert -- user's --, therefor.

In Column 9, Line 13, delete "microcontroller C)," and insert -- microcontroller μC), --, therefor.

Signed and Sealed this
Fifth Day of July, 2016

Michelle K. Lee
*Director of the United States Patent and Trademark Office*